US012811672B2

(12) United States Patent
Brown et al.

(10) Patent No.: US 12,811,672 B2
(45) Date of Patent: Nov. 24, 2026

(54) HYBRID 5G NETWORKS

(71) Applicant: MICROSOFT TECHNOLOGY LICENSING, LLC, Redmond, WA (US)

(72) Inventors: Michael Anthony Brown, McKinney, TX (US); Christian Joseph Rodriguez, Loxahatchee, FL (US); Khawaja Sadiq Naveed Daniyal, Dubai (AE); Bandhan Dutta, Redmond, WA (US); SHimona Gorelick, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 294 days.

(21) Appl. No.: 18/401,409

(22) Filed: Dec. 30, 2023

(65) Prior Publication Data

US 2025/0105915 A1 Mar. 27, 2025

Related U.S. Application Data

(60) Provisional application No. 63/540,623, filed on Sep. 26, 2023.

(51) Int. Cl.
*H04B 7/185* (2006.01)
*H04W 84/06* (2009.01)

(52) U.S. Cl.
CPC ..... *H04B 7/18539* (2013.01); *H04B 7/18523* (2013.01); *H04B 7/18534* (2013.01); *H04W 84/06* (2013.01)

(58) Field of Classification Search
CPC ............ H04B 7/18539; H04B 7/18523; H04B 7/18534; H04B 7/18526; H04W 84/06
See application file for complete search history.

(56) References Cited

U.S. PATENT DOCUMENTS

2018/0013486 A1* 1/2018 Irani ...................... H04B 7/195
2022/0086713 A1* 3/2022 Määttänen ...... H04W 36/00837
2022/0217589 A1* 7/2022 Wang ................. H04B 7/18513
(Continued)

OTHER PUBLICATIONS

"Digital Video Broadcasting (DVB); Second Generation DVB Interactive Satellite System (DVB-RCS2); Part 2: Higher Layers Satellite Specification", Retrieved from: https://www.etsi.org/deliver/etsi_en/301500_301599/30154502/01.02.01_60/en_30154502v010201p.pdf, Apr. 2014, 239 Pages.
(Continued)

*Primary Examiner* — Kan Yuen
(74) *Attorney, Agent, or Firm* — Han Gim; Newport IP, LLC

(57) ABSTRACT

A system provides interoperation between Fifth Generation (5G) Non-Terrestrial Networks (NTN) and 3rd Generation Partnership Project (3GPP) 5G network with a satellite-based communications network. The system includes a Satellite Access Network (SAN) configured to process Satellite Digital Video Broadcast (DBB) waveforms, a Satellite Access Node (sAN) configured with functionality of a ground station modem and portions of an existing network management system (NMS), and a Fixed Network-Residential Gateway (FN-RG) that comprises a logical representation of the remote modem.

20 Claims, 11 Drawing Sheets

(56) References Cited

U.S. PATENT DOCUMENTS

| | | | | |
|---|---|---|---|---|
| 2023/0261739 A1* | 8/2023 | Shi | H04W 36/083 455/427 |
| 2025/0330991 A1* | 10/2025 | Liao | H04W 56/001 |

OTHER PUBLICATIONS

"Digital Video Broadcasting (DVB); Second Generation DVB Interactive Satellite System (DVB-RCS2); Part 3: Higher Layers Satellite Specification", Retrieved from: https://www.etsi.org/deliver/etsi_ts/101500_101599/10154503/01.01.01_60/ts_10154503v010101p.pdf, May 2012, 131 Pages.
"IPv6 in the context of TR-101", In Technical Report of Broadband Forum, Nov. 2017, 50 Pages.
"Multi-service Broadband Network Architecture and Nodal Requirements", In Technical Report of Broadband Forum, Issue 2, Sep. 2017, 96 Pages.
"Procedures for the 5G System", Retrieved from: https://www.etsi.org/deliver/etsi_ts/123500_123599/123502/16.07.00_60/ts_123502v160700p.pdf, Jan. 2021, 607 Pages.
"TR-456 AGF Functional Requirements", In Technical report of Broadband Forum, Aug. 2020, 108 Pages.
"System architecture for the 5G System", Retrieved from: https://www.etsi.org/deliver/etsi_ts/123500_123599/123501/16.06.00_60/ts_123501v160600p.pdf, Oct. 2020, 450 Pages.
"TR-101—Migration to Ethernet-Based Broadband Aggregation", In Technical Report of Broadband Forum, Jul. 2022, 101 Pages.
"Wireless and wireline convergence access support for the 5G System (5GS)", Retrieved from: https://www.etsi.org/deliver/etsi_ts/123300_123399/123316/16.04.00_60/ts_123316v160400p.pdf, Jul. 2020, 83 Pages.
"TR-470 5G Wireless Wireline Convergence Architecture", In Technical Report of Broadband Forum, Aug. 2020, 77 Pages.

* cited by examiner sAN: Satellite Access Node
AGF: Access Gateway Function

HYBRID 5G NETWORKS

PRIORITY APPLICATION

This application claims the benefit of and priority to U.S. Provisional Patent Application No. 63/540,623, filed Sep. 26, 2023, the entire contents of which are incorporated herein by reference.

BACKGROUND

Non-Terrestrial networks (NTN) are wireless communication systems that operate above the ground, such as by satellites and high-altitude platforms. Support for NTN was introduced in Release 17 (Rel-17) and is known as 5th Generation (5G) NTN. 5G NTN introduced significant architectural changes to the Radio Access Network (RAN) interfaces requiring both devices and satellite infrastructure to become 3GPP aware. It is likely that current satellite waveforms and 5G NTN network models will co-exist for some time as seamless migration occurs. Satellite operators are in the process of modernizing their networks and would like to capitalize on the cloud native aspects and 3GPP 5G core without waiting for 5G NTN.

It is with respect to these considerations and others that the disclosure made herein is presented.

SUMMARY

5G NTN is considered 3GPP access while existing satellite waveforms can be defined as non-3GPP. Non-3GPP refers to the primary protocols not being defined by 3GPP, for example Wireless Local Area Network (WLAN) access and wireline access defined by Broadband Forum (BBF). Additionally, existing satellite devices are unable to connect directly to the 3GPP 5G core network. The present disclosure leverages the BBF concepts and protocol to manage a Satellite Access Network to support connections between satellite devices and the 3GPP 5G core network.

In the present disclosure, a Satellite Access Network (SAN) is described. The SAN is a satellite network conforming with Satellite Digital Video Broadcast (DVB) Waveforms specified by European Telecommunications Standards Institute (ETSI). The egress interface of a wireline access network is the V interface. The SAN includes satellite access nodes including those for aggregation.

In various embodiments, a Satellite Access Node (SA node or sAN) is disclosed. The sAN includes the function of a ground station modem and portions of an existing network management system (NMS). The NMS is aware of the satellite network topology along with the remote modem. The sAN supports satellite communication waveforms as specified for example in ETSI EN 302 307 and ETS EN 302 307-2. The sAN is based on the Wireline Access Node (wAN) functionality specified in BBF TR-45612 and BBF TR-47012 with enhancements to support satellite access.

In various embodiments, a Fixed Network Residential Gateway (FN-RG) is disclosed. The FN-RG located at the ground station is a logical representation of the remote satellite modem and is configured to manage the connectivity and interworking with the 5G Core via the Access Gateway Function (AGF) as specified in TS 23.316, BBF TR-45612, and BBF TR-47012. The FN-RG acts as a proxy for the remote satellite modem, with enhancements to support requirements and capabilities specified in 3GPP TS 23.316, BBF TR-45612 and BBF TR-47012.

The techniques disclosed herein allow for the existing satellite systems to connect to the 3GPP 5G core network and operate more efficiently, thus saving the use of memory, processing resources, network resources, etc. Other technical effects other than those mentioned herein can also be realized from implementations of the technologies disclosed herein.

This Summary is provided to introduce a selection of concepts in a simplified form that are further described below in the Detailed Description. This Summary is not intended to identify all of the key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION OF ILLUSTRATIVE EMBODIMENTS

Existing solutions for supporting connections between satellite devices and a 3GPP 5G core network have various shortcomings. For example, existing solutions include proprietary implementation (hardware and software) to connect to the Satellite Network Operator's (SNO's) data network (DN). SNOs typically operate equipment from multiple vendors and utilize both hardware and software to scale the network based on demand. The 5G Core (5GC) allows operators to deploy a single core network to support multiple access types (3GPP, Wireline, WiFi) and now requires support for satellite access.

Another shortcoming is that 3GPP and BBF defined an architecture to allow wireline devices to connect to the 5G Core, allowing operators to utilize a common platform for services. However, the end devices are "non-3GPP aware" which requires utilizing interworking functions to enable connectivity. Existing satellite access typically consists of a remote modem, a ground station modem, and management system.

Figure 1:
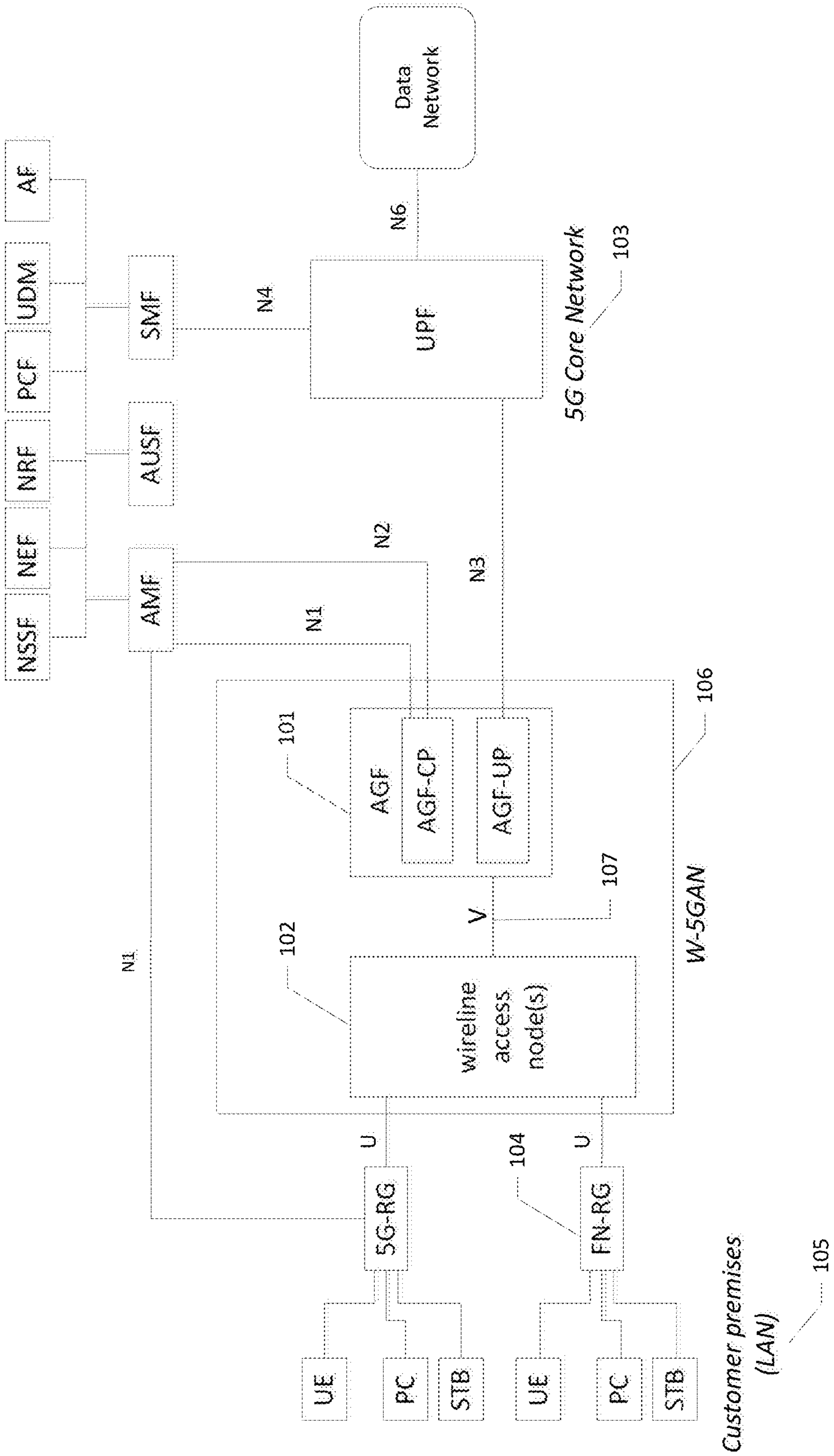
FIG. 1 depicts an example environment illustrating an embodiment of the disclosure.

FIG. 1 illustrates connectivity that is depicted in BBF TR-45612 and BBF TR-47012. Referring to FIG. 1, the Access Gateway Function (AGF) 101 is implemented as a logical function deployed between the physical access media (e.g., DSL, PON, GE) in the wireline access network and the 5G core network 103. The Fixed Network-Residential Gateway (FN-RG) 104 is an RG connecting a home local area network (LAN) 105 to the wireline access node(s) (wANs) 102, which does not exchange NI signaling with the 5GC. The Wireline Access Network (WAN) 106 is an access network conforming with TR-10112/TR-17812. This network can be implemented using, for example, optical fiber or electrical cable. The egress interface of a WAN is the V interface 107. The WAN 106 includes wireline access nodes and optionally some form of aggregation.

Examples of wireline access nodes (WANs) that can be part of the Wireline 5G Access Network (W-5GAN) include: Optical Line Terminals (OLTs) in support of fiber access networks, Digital Subscriber Line Access Multiplexers (DSLAMs) in support of twisted-pair access networks, and Cable Modem Termination Systems (CMTSs) in support of coaxial access networks.

The BBF architecture is designed to connect fixed devices that do not have mobility whereas in systems that communicate with satellite waveforms, both the satellite terminal and connection are mobile. The present disclosure leverages BBF concepts and protocols to manage the Satellite Access Network (SAN). Existing Satellite Access networks consist of a Remote Modem, a Ground Station Modem, and a Management System (e.g. Network Management System (NMS)).

The Remote Modem is a terminal connecting LANs via satellite to a Satellite Network Operator (SNO) Data Network (DN), e.g., operator services, Internet access, or 3rd party services. The FN-RG located at the ground station acts as a proxy for the remote modem. Examples of satellite waveforms include:

DVB-RCS2: ETSI TS 101 545-3: "Digital Video Broadcasting (DVB); Second Generation DVB Interactive Satellite System (DVB-RCS2); Part 3: Higher Layers Satellite Specification.". ETSI EN 301 545-2 V 1.1.1 (2012 January): "Digital Video Broadcasting (DVB); Second Generation DVB Interactive Satellite System (DVB-RCS2); Part 2: Lower Layers for Satellite standard."

DVB-S2X: DVB-S2/S2X, S2 Extension, EN 302 307-2, v 1.3.1, 2021-07 (applicable document) and DVB-S2, EN 302 307-1, v 1.4.1, v 2014-11, DVB-S2X, Implementation Guidelines, ETSI TR 102 376-2, v 1.2.1, 2021 January Examples are provided for DVB-RCS2 for illustrative purposes, but can also include DVB-S2X.

The Ground Station Modem implements functionality of a gateway or Network Control Center (NCC) specified in ETSI TS 101 545-3: "Digital Video Broadcasting (DVB); Second Generation DVB Interactive Satellite System (DVB-RCS2); Part 3: Higher Layers Satellite Specification."

The Network Management System (NMS) implements the network management functionality associated with the DVB-RCS2 network described in ETSI TS 101 545-3 section 8 and other management functionality including: authenticating the remote modem, managing the satellite coverage area, assigning the remote modem to a coverage area, and managing the connectivity to a ground station.

In various embodiments, the present disclosure describes various functions and systems to manage a Satellite Access Network to support connections between satellite devices and the 3GPP 5G core network. In an embodiment, a Satellite Access Network (sAN) is a satellite network conforming to TR-10112/TR-17812, for Satellite Digital Video Broadcast (DBB) waveforms specified by ETSI. The egress interface of a wireline access network is the V interface. The Satellite Access Network (SAN) contains satellite access nodes including those used for aggregation.

In an embodiment, the Satellite Access Node (sAN) includes the function of a Ground Station Modem and portions of an existing NMS. The NMS is aware of the Satellite network topology along with the Remote Modem. The sAN supports satellite communication waveforms as specified for example in ETSI EN 302 307 and ETS EN 302 307-2. The sAN is based on the Wireline Access Node (wAN) functionality specified in BBF TR-45612 and BBF TR-47012 with enhancements to support satellite access.

In an embodiment, a Fixed Network Residential Gateway (FN-RG) is described. The FN-RG located at the ground station is a logical representation of the remote satellite modem and is configured to manage the connectivity and interworking with the 5G Core via the AGF as specified in TS 23.316, BBF TR-45612 and BBF TR-47012. The FN-RG acts as a proxy for the remote satellite modem, with enhancements to support requirements and capabilities specified in 3GPP TS 23.316, BBF TR-45612 and BBF TR-470i2. In some embodiments, an Access Gateway Function (AGF) is included.

5G NTN introduced significant architectural changes to satellite radio interfaces, requiring both devices and satellite infrastructure to be 3GPP aware. It can be expected that current satellite waveforms and 5G NTN network models will co-exist for some time as seamless migration occurs. The present disclosure provides a seamless way to manage the coexistence of the old system (satellite waveforms) and the new system (5G Core), which is referred to herein as Hybrid-NTN.

In an embodiment of a Hybrid-NTN architecture, the wireless and wireline convergence architecture developed by 3GPP and Broadband Forum (BBF) is leveraged to integrate Wireline Access Networks and Fixed Wireless Access into the 5G Core. Specifically, an AGF is adapted for use in satellite networks and is implemented so that a Satellite Network Operator (SNO) can use a common 5G Core to operate existing non-3GPP modems and networks side-by-side with 5G NR-NTN capable devices and networks. This reduces upfront investment costs, risks, and rollout time required to integrate NR-NTN capability with existing infrastructure.

Figure 2:
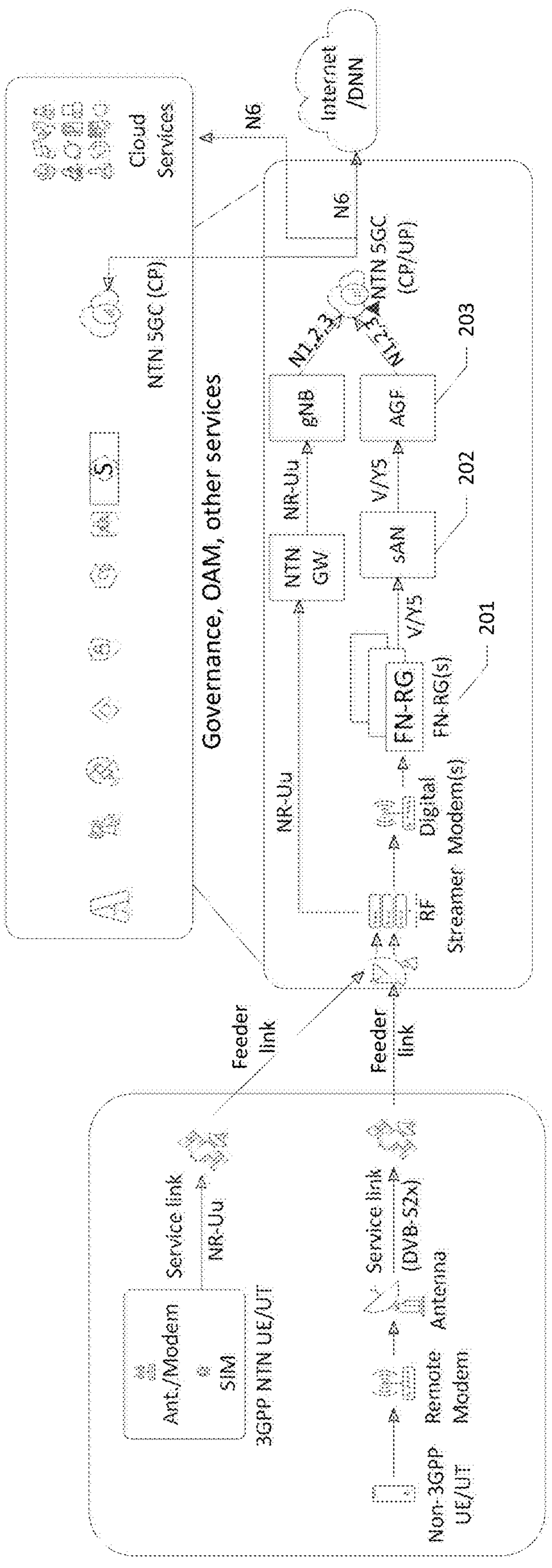
FIG. 2 depicts an example environment illustrating an embodiment of the disclosure.

With reference to FIG. 2. illustrated is an example Hybrid and NR-NTN Satellite Architecture in accordance with the disclosure. In various embodiments, the disclosure describes the FN-RG 201, sAN 202, and AGF 203. To enable Hybrid-NTN, in an embodiment the Fixed Network Residential Gateway (FN-RG) 201 and Wireline Access Node (wAN) (the Satellite Access Node (sAN 202) in FIG. 2) are repurposed.

Figure 3:
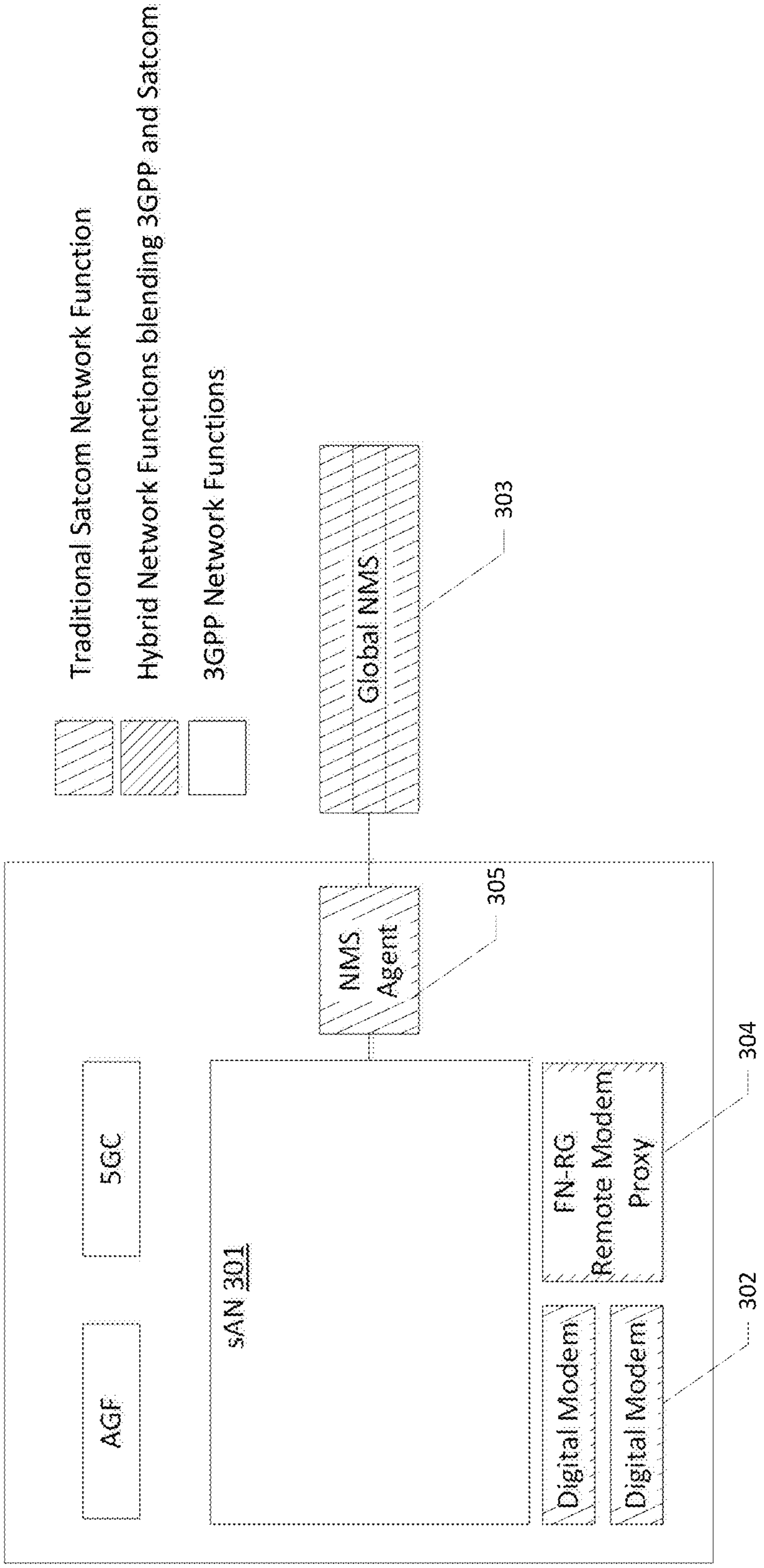
FIG. 3 depicts an example environment illustrating an embodiment of the disclosure.

With reference to FIG. 3, illustrated are example Hybrid-NTN Satcom components showing the sAN components and the NMS. Satellite Access components for Hybrid-NTN include the sAN 301, a Virtualized Satcom Modem (vModem) 302, a Remote Satellite Modem 304, and NMS agent 305 that interacts with the Network Management System (NMS) 303 to facilitate the disclosed connectivity.

Figure 4:
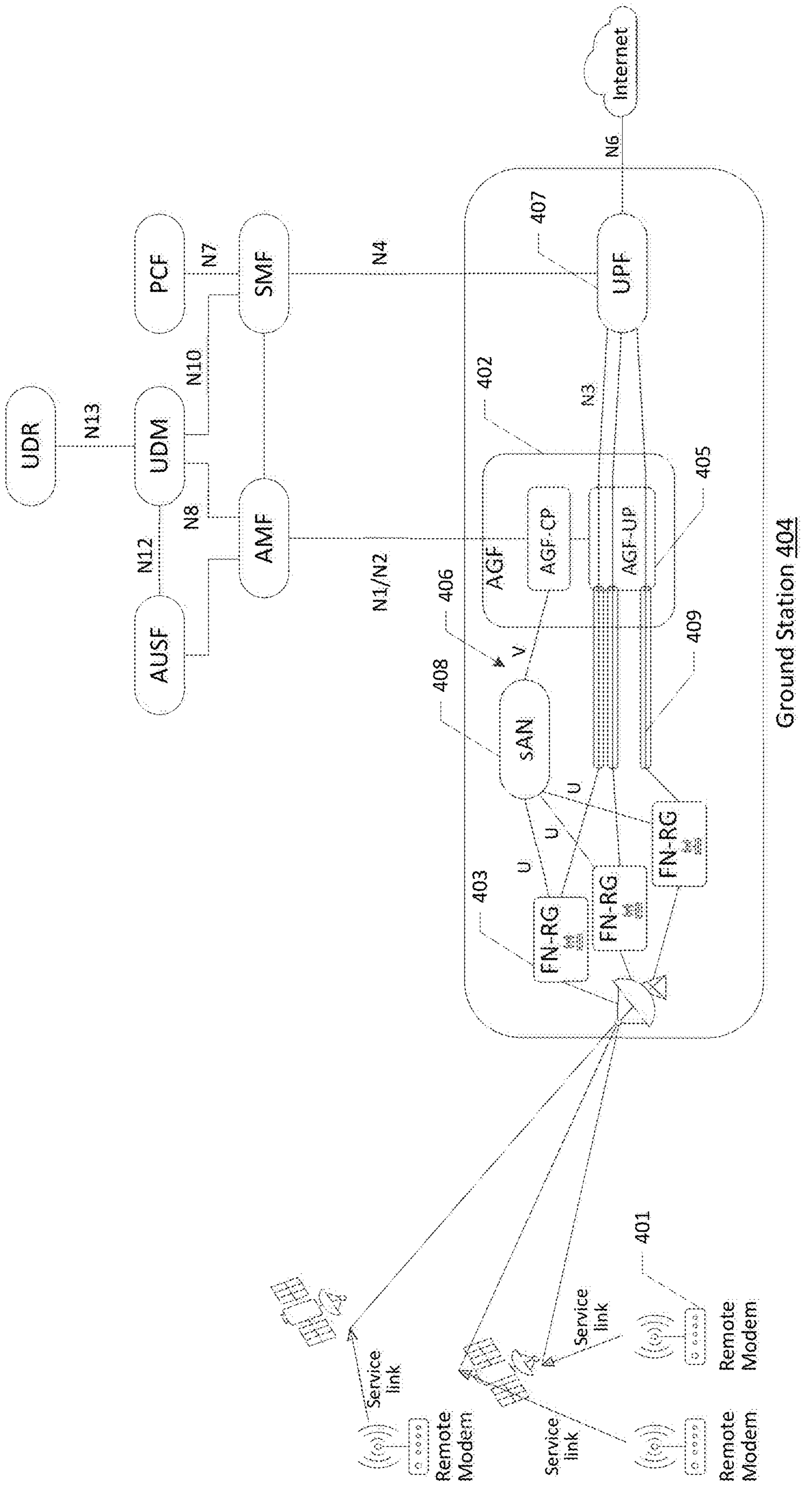
FIG. 4 depicts an example environment illustrating an embodiment of the disclosure.

In an embodiment and as illustrated in FIG. 4, remote satellite modems 401 provide connectivity to the SNO Data Network (DN) via a vModem connection. The SAN supports wAN requirements needed to establish an L2 connection with the AGF 402, while the FN-RG 403 located at the ground station 404 acts as a proxy for the Remote Satellite Modem to manage resources required to:

Transmit data received from the AGF-UP 405 over the V-Interface 406 on the Forward Link.

Forward data from the Satellite Terminal on the Return Link to the AGF-UP 405.

Detailed descriptions of FN-RG and wAN functionality are included in BBF TR-45612 and BBF TR-47012 and 3GPP TS 23.316. The NMS Agent interacts with the Global NMS to leverage existing capabilities such as authentication of the Remote Satellite Modem. FIG. 4 illustrates an example of Hybrid-NTN-3GPP and Satellite Waveform Integration.

Figure 5:
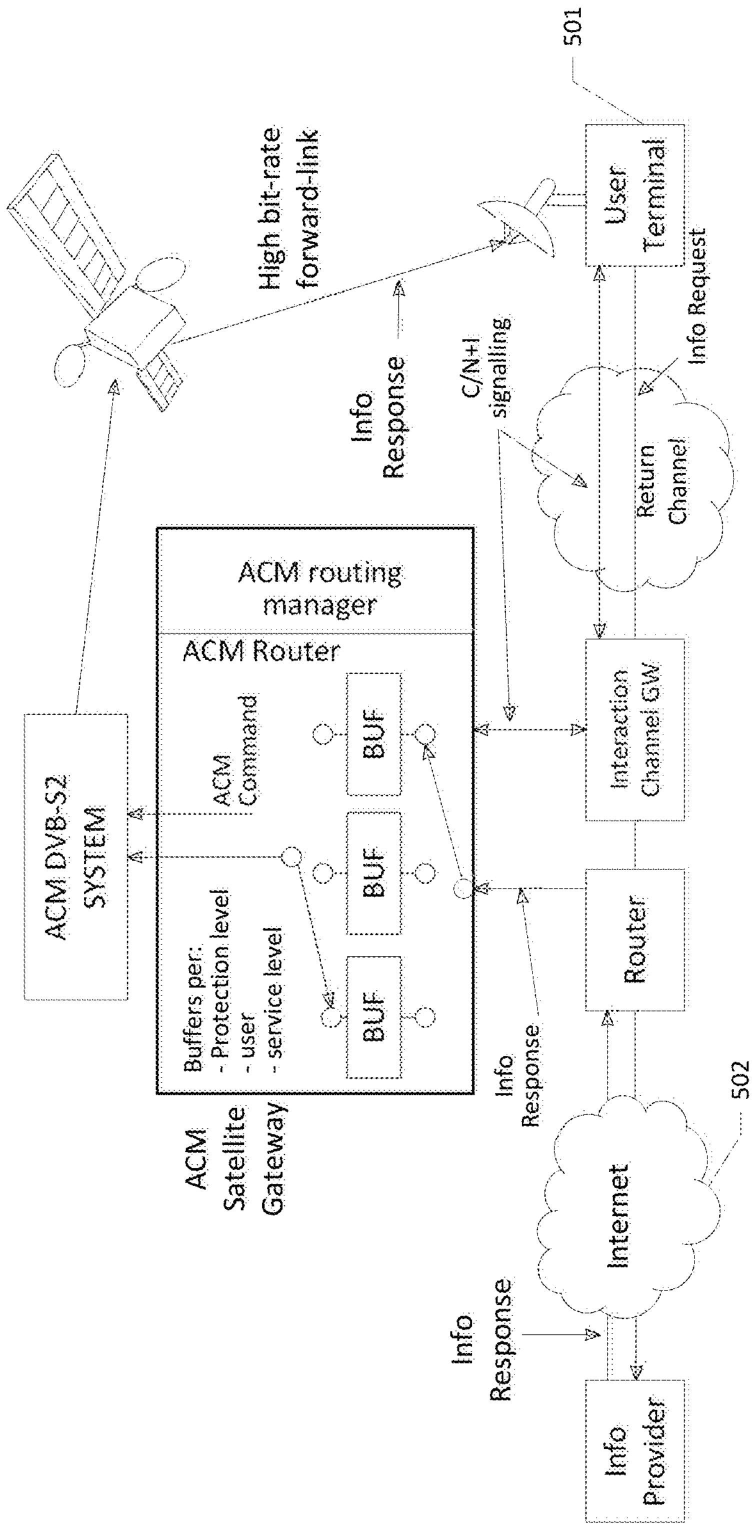
FIG. 5 depicts an example environment illustrating an embodiment of the disclosure.

Satellite Access and 5GC integration builds on concepts from ETSI Digital Video Broadcasting (DVB) standards shown in FIG. 5, specifically where the User Terminal 501 is not capable of 3GPP signaling. FIG. 5 illustrates an example of IP services using a legacy satellite architecture and its associated components using DVB-S2 ETSI EN 302 301v 1.2.1. In the present disclosure, the Internet access 502 is replaced using the AGF.

In an embodiment, existing mechanisms are reused to authenticate the Remote Satellite Modem prior to initiating the L2 connection with the AGF 402. Additionally, the Remote Satellite Modem 401 and vModem support the Satellite Waveform architecture as described in Digital Video Broadcasting (DVB) specifications EN 302 307 and ETS EN 302 307-2

In an embodiment, the FN-RG 403 acts as a proxy for the Remote Satellite Modem 401, with enhancements to support requirements and capabilities specified in 3GPP TS 23.316, BBF TR-456i and BBF TR-47012. Ethernet is provided via the L2 interface as specified in BBF TR-101 and BBF TR-178. The U interface is specified in BBF TR-101 section 2.2. The U interface supports Point-to-Point Protocol over Ethernet (PPPOE) (option f).

The FN-RG connects to a W-AGF via a layer-2 (L2) connection, based on Wireline AN (wAN) specific procedures using the V-interface defined in BBF TR-178. The control plane is shown in FIG. 6.

For the V interface 406, a single PPPOE session is provided per FN-RG. In some embodiments, support for multiple PPPOE sessions per FN-RG as described in BBF TR-45612 session 6.11 is included. PPPOE procedures are in accordance with BBF TR-45612 section 5.2. For Link Control Protocol (LCP) procedures, BBF TR-45612 section 5.3 lists the LCP Control procedures for the FN-RG, specifically LCP Configure and LCP Echo. In an embodiment, the LCP Terminate procedure is used to allow the FN-RG to report when connectivity to the Remote Satellite Modem is lost. L2 Connection supervision is in accordance with BBF TR-47012 section 5.7.

FIG. 4 illustrates an example with multiple remote modems 401 and where multiple FN-RGs 403 are created for each remote modem 401. The FN-RGs 403 interact with the sAN 408 and user plane (UP) pipe components 409 which connect to the AGF 405. AGF 405 communicates with the 5G network via UPF 407 on the core network to provide IP connectivity.

Figure 6:
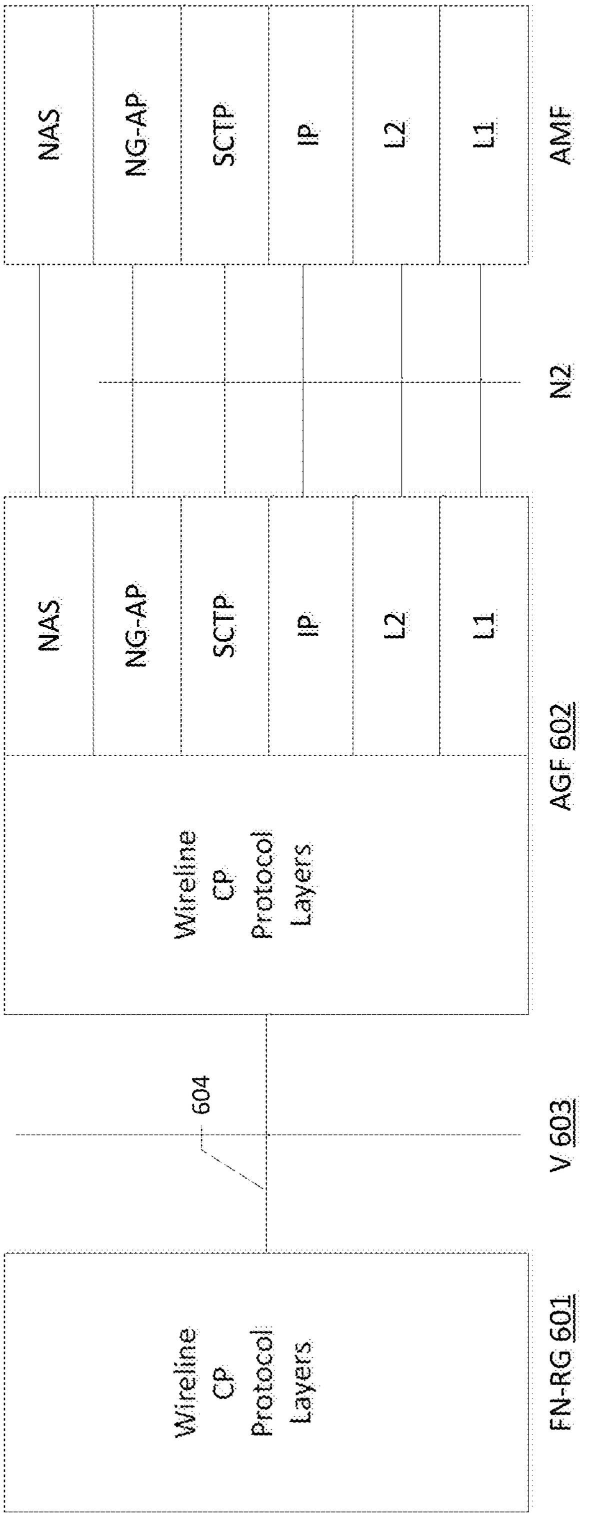
FIG. 6 depicts an example environment illustrating an embodiment of the disclosure.

FIG. 6 further illustrates control plane aspects of the FN-RG Protocol Layers. The FN-RG 601 supports PPPOE requirements specified in TR-45612 section 6.4.2.3. The FN-RG 601 initiates the connection with the AGF-CP 602 as described in TR-101. The V interface 603 used for the FN-RG connection 604 follows the requirements as defined in TR-101 Issue2 for Broadband Network Gateway (BNG). The Satellite Access Node (sAN) operates as a PPPOE Intermediate Agent, as specified by TR-101 Issue2 section 3.9.2, and the AGF 602 terminates the PPP session over Ethernet.

Figure 7:
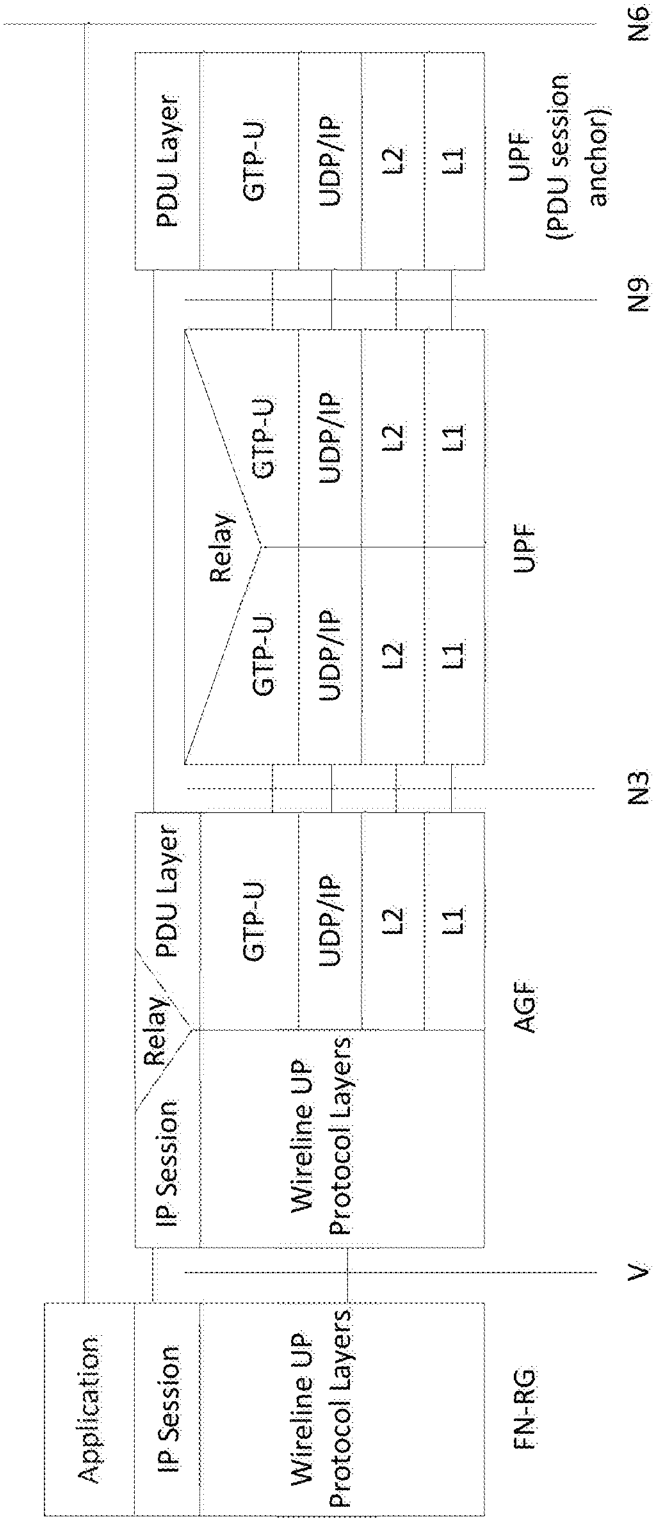
FIG. 7 depicts an example environment illustrating an embodiment of the disclosure.

The user plane encoding employed for PDU exchange between an AGF and an FN-RG is based on the traditional wireline protocols documented in TR-101/178, specifically IPoverPPP. The user plane connection between FN-RG and AGF follows the IP-session lifecycle management as defined in TR-101/TR-178 and between the AGF and UPF follows the PDU session management as defined in TS 23.502. The AGF proxies the FN-RG L2 Connection initiation to establish the user plane connection to the 5GC by initiating PDU Session establishment. FIG. 7 illustrates an example session lifecycle in the user plane.

The Satellite Access Node (sAN) supports the Satcom Waveforms as specified in ETSI EN 302 307 and ETS EN 302 307-2 and is enhanced to support the Wireline Access Node functionality specified in BBF TR-45612 and BBF TR-47012. The sAN manages the L2 connectivity towards the W-AGF for satellite terminals and obtaining a public IP address for access to the operators Data Network (DN).

The PPPOE Intermediate Agent intercepts all upstream PPPOE discovery stage packets, i.e., the PADI, PADR, and upstream PPPOE Active Discovery Termination (PADT) packets, but does not modify the source or destination MAC address of these PPPOE discovery packets. Upon receipt of a PPPOE Active Discovery Initiation (PADI) or PPPOE active discovery request (PADR) packet sent by the PPPOE client, the Intermediate Agent adds a PPPOE TAG to the packet to be sent upstream. The TAG contains the identification of the access loop on which the PADI or PADR packet was received. The U interface is in accordance with BBF TR-101, and the V Interface is in accordance with BBF TR-178.

In an embodiment, every remote satellite is assigned a Line ID (PPPOE format as shown BBF TR-47012 section 7.1). The sAN maps a Remote Satellite Modem to its Line ID before forwarding the L2 Connection over the V-Interface to the AGF.

The AGF is configured to enable IP connectivity for Wireline Access Networks and Fixed Wireless Access devices with little or no movement within the FN-RG's coverage area. In contrast satellite characteristics include:

Mobility where both the Remote Satellite Modem and end devices are moving.

Satellite links are susceptible to failure due to weather conditions (i.e., rain, snow) or physical obstructions. To better manage 5GC resources, the FN-RG synchronizes the state of the satellite link with the AGF. In an embodiment, the FN-RG provides an indication to the AGF when the connection to a Remote Satellite Modem fails and recovers.

In various embodiments, the PPPOE and LCP provide mechanisms to adapt to the characteristics of satellite waveforms. The FN-RG sends a PPPOE PADI whenever the connection with the Remote Satellite Modem is (re) established.

The FN-RG and AGF support liveliness checks via LCP-ECHO. In an embodiment, periodicity for this check is configurable. The FN-RG initiates an LCP Terminate-Request whenever the connection between the Remote Satellite Modem and ground station is declared as failed.

Figure 8:
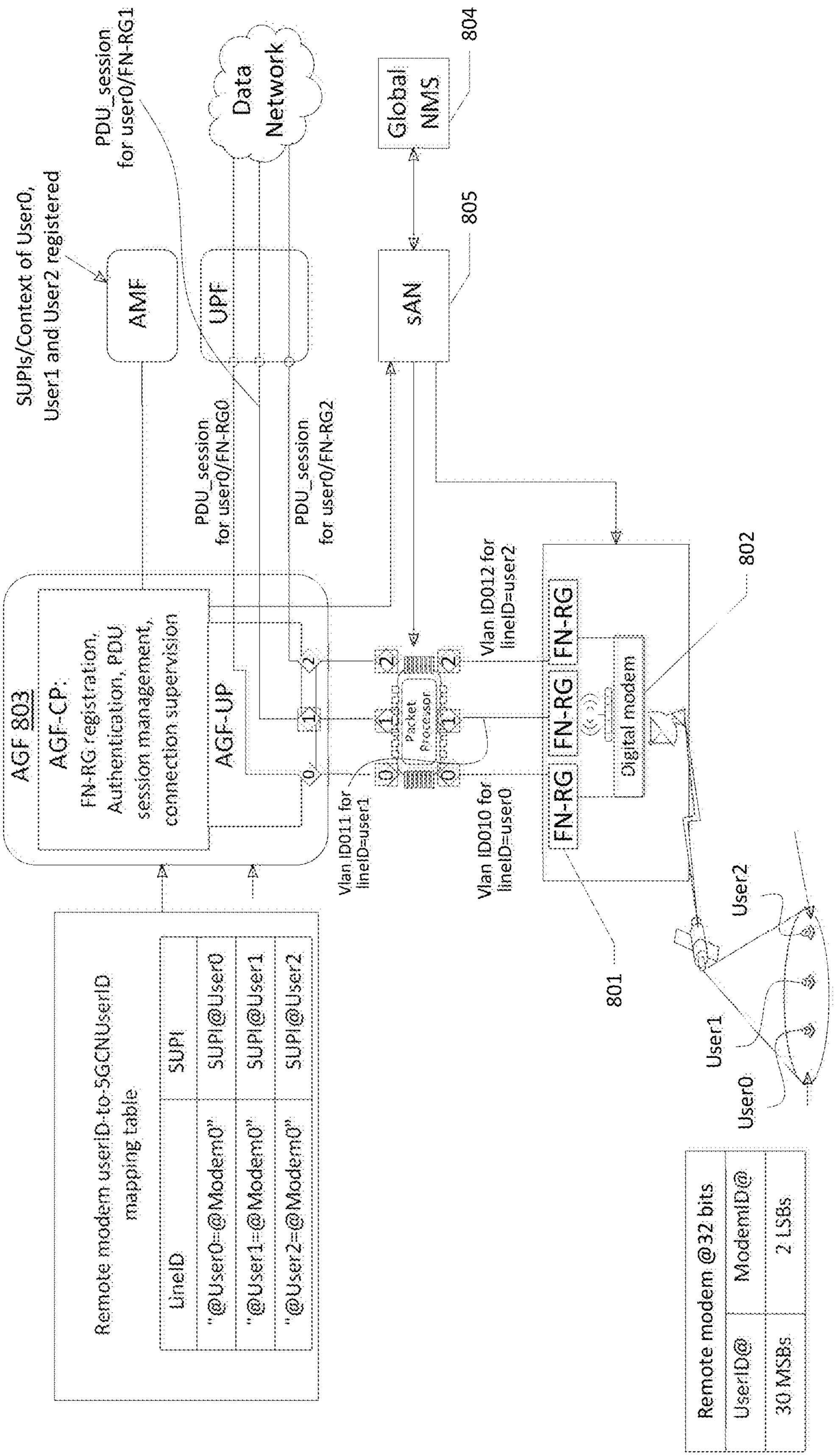
FIG. 8 depicts an example environment illustrating an embodiment of the disclosure.

FIG. 8 illustrates an example architecture of Hybrid-NTN and AGF integration and shows an example with multiple FN-RGs 801 relative to the Digital IF (De) Mod 802. Each FN-RG 801 represents a Remote Satellite Modem. The AGF 803 maintains an independent state for each of the FN-RGs 801. When receiving a registration request from a lineID having UserId MSB already registered but where the modemID is not the same that was already registered, the AGF will deduce that there is a handover in progress and maintain the PDU session routing to the FN-RG.

The FN-RGs are deployed by making an association between the remote modem and LineIDs. The end-to-end paths are established for the user plane traffic maintaining the same PDU session for both paths. The VLANs are configured, and the VLANs are mapped per Remote Satellite Modem and a request is sent to the AGF for registration of FN-RGs.

FIG. 8 illustrates mapping of the remote modem to the resources in the ground station. In an embodiment, VLAN tagging is used to direct packets through the network for each of the remote modems. The sAN 805 interacts with the global NMS 804 to identify and provide the mapping when a device connects. In the example shown in FIG. 8, the first remote modem has a 32-bit modem ID, where the 30 most significant bits=@user0 and the two least significant bits=@modemID0. The second remote modem has a 32-bit modem ID with the 30 most significant bits=@user0 and the two least significant bits=@modemID0. The third remote modem has a 32-bit modem ID with the 30 most significant bits=@user0 and the two least significant bits=@modemID0. More generally, FIG. 8 shows how a line ID is assigned to the remote terminal and that the sAN then uses the line ID to map the remote terminal to the FN-RG so that it can act as a proxy. The underlying construction (for example as shown in FIG. 8) can be implementation specific.

The present disclosure enhances the following procedures specified in BBF TR-45612 section 8.1 to support legacy satellite waveforms (i.e., DVB-RCS2, DVB-S2X):

| Procedure | Triggers |
|---|---|
| FN-RG IP Session Initiation with PPPoE | Triggers for FN-RG IP Session Initiation described in BBF TR-456i2 section 8.1.1<br>The Remote Satellite Modem has been successfully authenticated prior to starting IP session initiation.<br>Connection to Remote Satellite Modem re-established after a failure.<br>Remote Satellite Modem mobility |
| Registration Management Procedures for FN-RG | The AGF initiates the Registration Procedure during a FN-RG IP Session Initiation as detailed in BBF TR-456i2 section 8.1.1. |
| Service Request Procedure for FN-RG | The AGF initiates the Service Request procedure when the FN-RG re-establishes an L2 connection after a link failure as detailed in TR-456i2 section 8.1.7 |
| Deregistration Procedure for FN-RG | BBF TR-456i2 section 8.1.9.<br>AGF Initiated<br>Detecting a change of FN-RG equipment since the last registration, e.g., shown by a new MAC address in the signaling packets initiating a new IP session.<br>The termination of the last IP session by PPPoE based FN-RG.<br>The expiration of the internal timer in CM-CONNECT mode without PDU session context.<br>The expiration of the AGF deregistration timer. |

-continued

| Procedure | Triggers |
|---|---|
| | The triggers for network-initiated deregistration include:<br>Termination of the subscription in 5GC<br>The expiration of the AMF deregistration timer. |
| FN-RG or Network Requested PDU Session Release via W-5GAN | FN-RG Initiated:<br>Keepalive failure of the PPP session<br>Receipt of a PADT for PPPoE from the FN-RG (i.e., during graceful shutdown of a PPP session) |
| FN-RG AN Release | The AN Release Procedure for the FN-RG is used to release the NG-AP signaling connection and the associated N3 user plane connections between the W-5GAN and the 5GC.<br>The AN release procedure may be triggered by a loss of connectivity with the FN-RG detected by the AGF.<br>Expiry of user inactivity timer indicating no user data sent or received in configured time interval.<br>LCP Terminate Request received for the PPPoE session from the FN-RG |
| Connection Supervision | Both AGF and FN-RG support liveliness checks via LCP Echo Requests as described in BBF TR-470i2 section 5.7. The periodicity for this check is configurable.<br>The FN-RG stops responding to LCP Echo requests when the connection to the remote modem is considered failed. Not necessary if the FN-RG sends LCP Terminate Request.<br>The FN-RG initiates the L2 Connection setup procedure whenever the connection to the Remote Satellite Modem is reestablished. |

Figure 9:
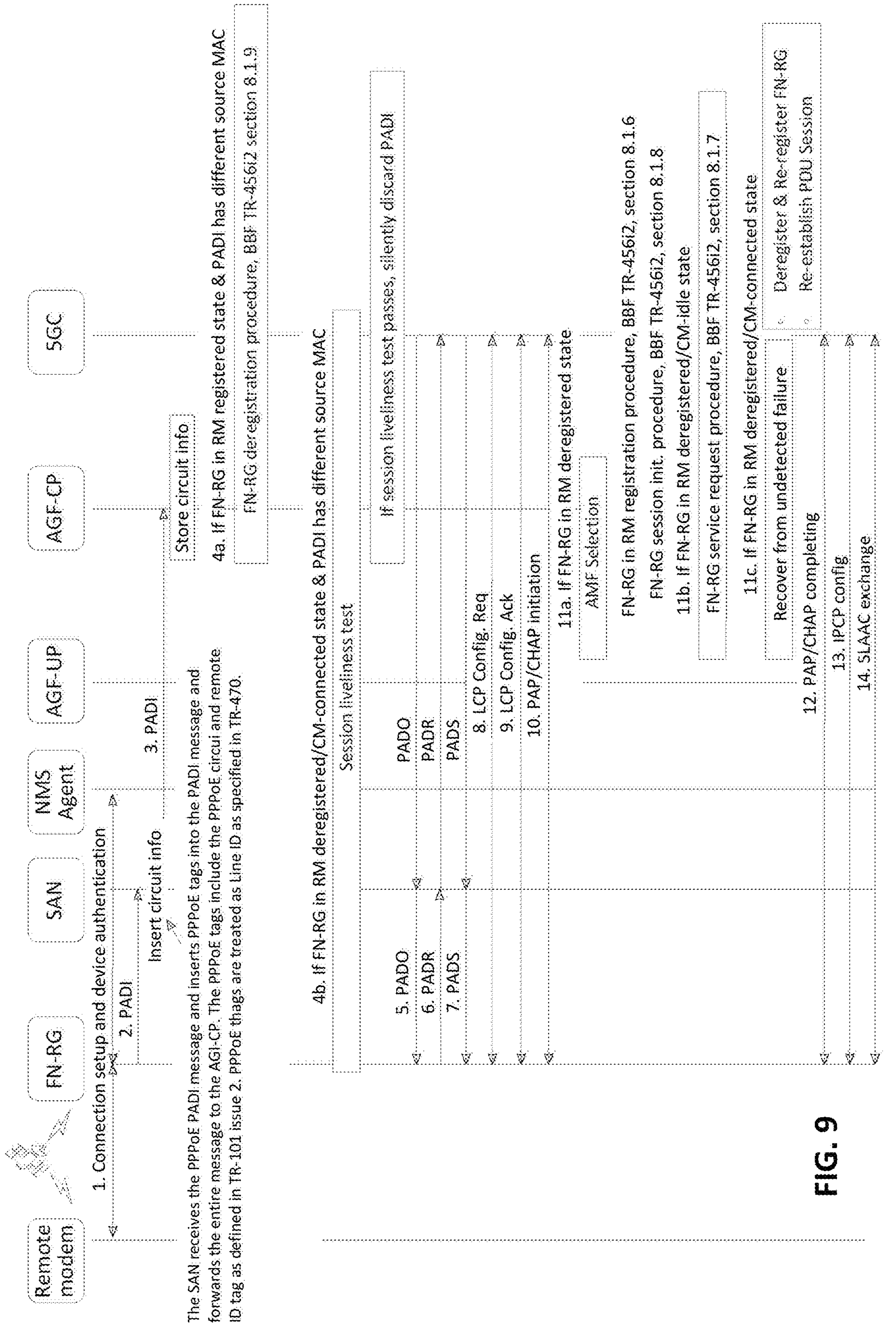
FIG. 9 depicts an example environment illustrating an embodiment of the disclosure.

The L2 Connection is shown in FIG. 9 which illustrates IP session initiation with PPPOE, when the remote modem connects to the 5G core. FIG. 9 illustrates the L2 connection for the remote modem to the sAN including the connection and device authentication which is handled by the sAN and NMS. After the device has been authenticated, the FN-RG initiates the L2 connection set up with the AGF. 4a illustrates that if the FN-RG in RM is in a registered state and the PADI has a different source MACs then an FN-RG deregistration procedure is performed per BBF TR-45612 section 8.1.9. 4b. If the FN-RG in RM is deregistered, is in a CM-connected state, and the PADI has a different source MAC, a session liveliness test is performed.

The FN-RG initiates the L2 Connection with the AGF as described in BBF TR-45612 after the successful authentication of the Remote Satellite Modem. The sAN maps the Remote Satellite Modem to its Line ID. Subsequent parts of the procedure is as described in BBF TR-45612 section 8.1.1.

The present disclosure supports seamless mobility within the ground station. Specifically, the FN-RG is not expected to change when a mobility event occurs. The FN-RG initiates the Service Request procedure toward the AGF as specified in BBF TR-45612 section 8.1.7 under the following conditions:

Mobility within the satellite coverage area results in the connection moving to a new beam or satellite with no change in the ground station modem. The IP address previously allocated to the satellite terminal does not change.

The Satellite Terminal re-establishes the connection after a link failure.

The techniques described herein may be implemented for devices in communication with various wireless communications systems such as CDMA, TDMA, FDMA, OFDMA, and SC-FDMA. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

Figure 10:
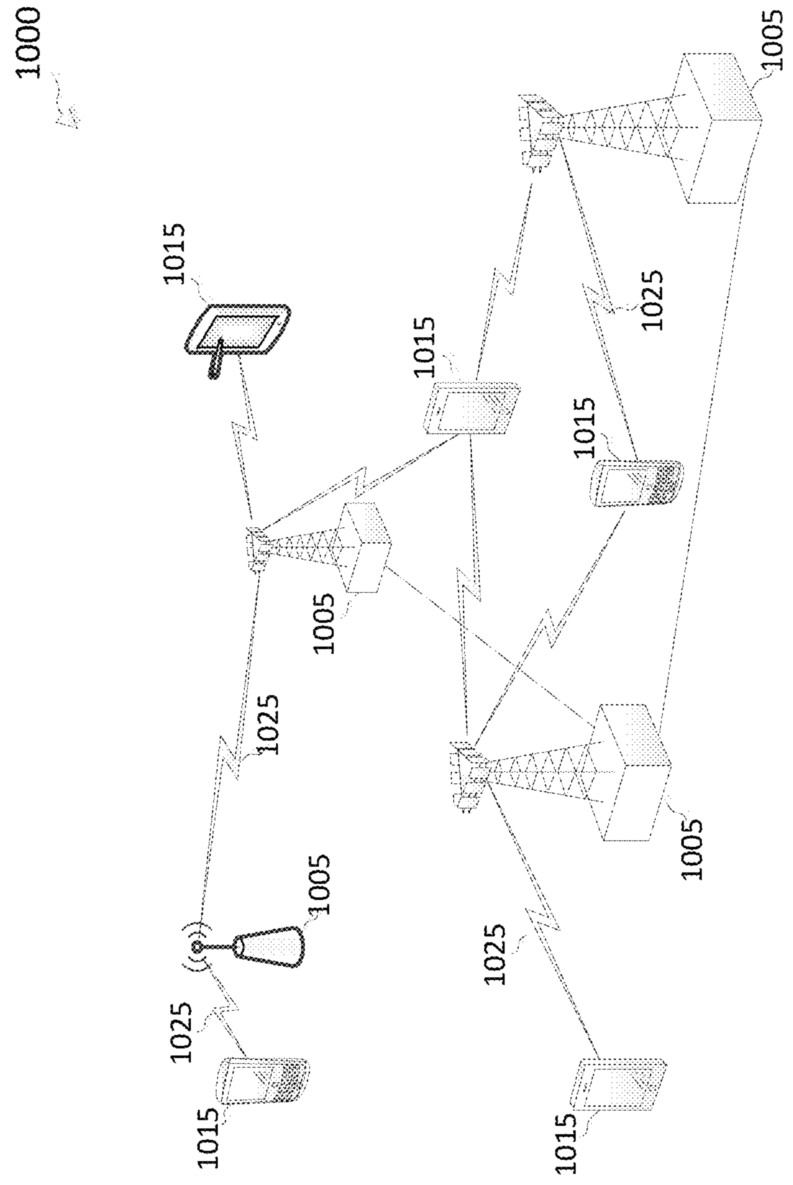
FIG. 10 depicts an example environment illustrating an embodiment of the disclosure.

FIG. 10 is a block diagram conceptually illustrating an example of a wireless communications system 1000, in accordance with an aspect of the present disclosure. The wireless communications system 1000 includes base stations (or cells) 1005 and mobile devices 1015. The base stations 1005 may communicate with the mobile devices 1015 under the control of a base station controller (not shown), which may be part of a core network or the base stations 1005. The wireless communications system 1000 may support operation on multiple carriers. Multi-carrier transmitters can transmit modulated signals simultaneously on the multiple carriers. For example, each communication link 1025 may be a multi-carrier signal modulated according to the various radio technologies described above.

The base stations 1005 may wirelessly communicate with the mobile devices 1015 via one or more base station antennas. The base stations 1005 sites may provide communication coverage for respective coverage areas. The mobile devices 1015 may be located throughout the wireless communications system 1000 and may be stationary or mobile. A mobile device 1015 may also be referred to as user equipment (UE), mobile station, a mobile unit, a subscriber unit, remote unit, a mobile device, a wireless communications device, a remote device, a mobile terminal, a wireless terminal, a handset, a mobile client, a client, or other suitable terminology. A mobile device 1015 may be a cellular phone, a wireless modem, a wireless communication device, a handheld device, a tablet computer, a laptop computer, or the like. The communication links 1025 shown in the wireless communications system 1000 may include uplink (UL) transmissions from a mobile device 1015 to a base station 1005, and/or downlink (DL) transmissions, from a base station 1005 to a mobile device 1015.

Figure 11:
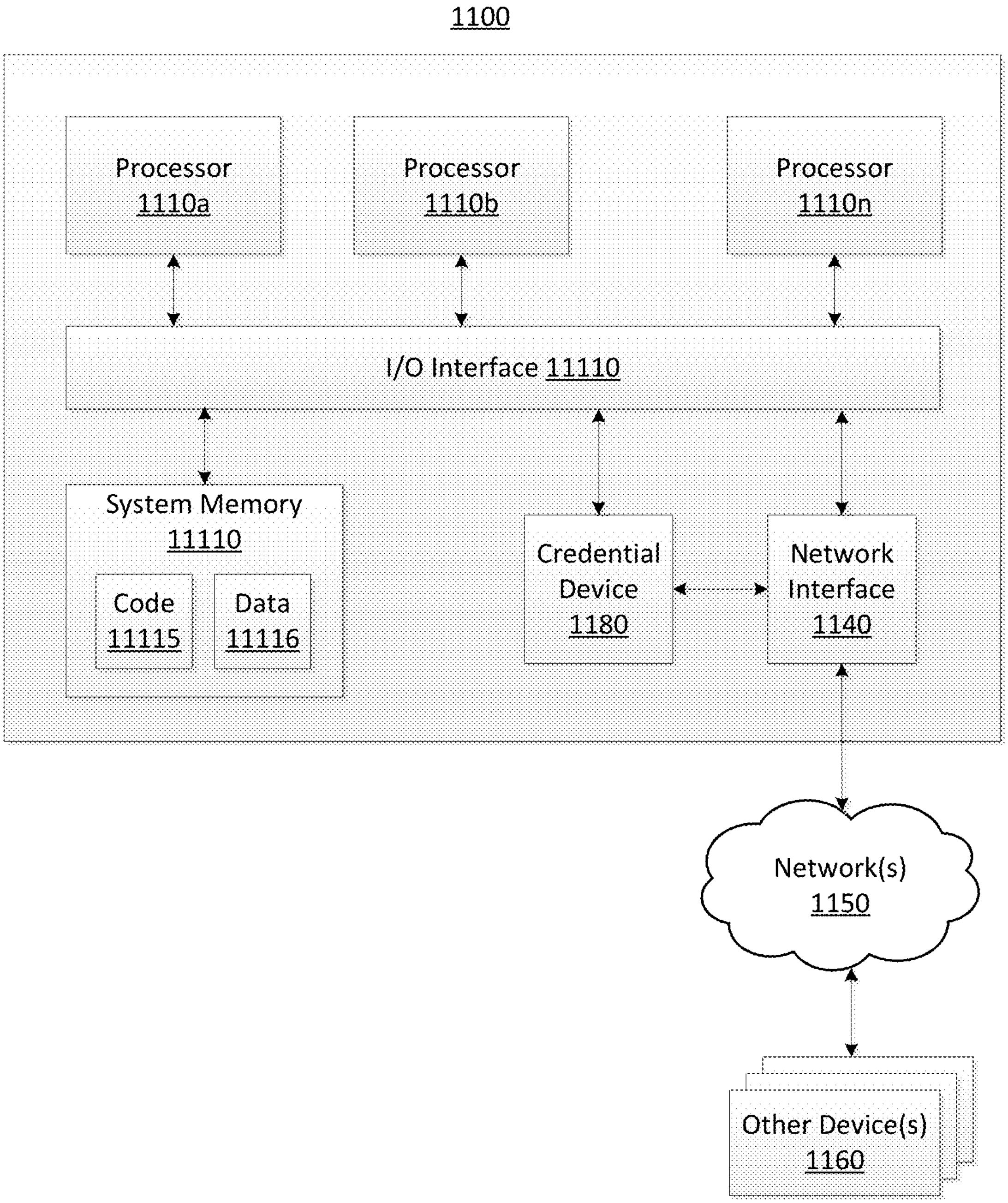
FIG. 11 depicts an example computing device.

In at least some embodiments, a computing device that implements a portion or all of one or more of the technologies described herein may include a general-purpose computer system that includes or is configured to access one or more computer-accessible media. FIG. 11 illustrates such a general-purpose computing device 1100. In the illustrated embodiment, computing device 1100 includes one or more processors 1110*a*, 1110*b*, and/or 1110*n* (which may be referred herein singularly as "a processor 1110" or in the plural as "the processors 1110") coupled to a system memory 11110 via an input/output (I/O) interface 11110. Computing device 1100 further includes a network interface 1140 coupled to I/O interface 11110.

In various embodiments, computing device 1100 may be a uniprocessor system including one processor 1110 or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 11110 may be configured to store instructions and data accessible by processor(s) 1110. In various embodiments, system memory 11110 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 11110 as code 11115 and data 11116.

In one embodiment, I/O interface 11110 may be configured to coordinate I/O traffic between processor 1110, system memory 11110, and any peripheral devices in the device, including network interface 1140 or other peripheral interfaces. In some embodiments, I/O interface 11110 may perform any necessary protocol, timing, or other data transformations to convert data signals from one component (e.g., system memory 11110) into a format suitable for use by another component (e.g., processor 1110). In some embodiments, I/O interface 11110 may include support for devices attached through various types of peripheral buses, such as a variant of the Peripheral Component Interconnect (PCI) bus standard or the Universal Serial Bus (USB) standard, for example. In some embodiments, the function of I/O interface 11110 may be split into two or more separate components, such as a north bridge and a south bridge, for example. Also, in some embodiments some or all of the functionality of I/O interface 11110, such as an interface to system memory 11110, may be incorporated directly into processor 1110.

Network interface 1140 may be configured to allow data to be exchanged between computing device 1100 and other device or devices 1160 attached to a network or network(s) 1150, such as other computer systems or devices as illustrated herein, for example. In various embodiments, network interface 1140 may support communication via any suitable wired or wireless general data networks, such as types of Ethernet networks, for example. Additionally, network interface 1140 may support communication via telecommunications/telephony networks such as analog voice networks or digital fiber communications networks, via storage area networks (SANs) such as Fibre Channel SANS, cellular voice and/or data networks, or via any other suitable type of network and/or protocol. When a network interface 1140 provides cellular communication, its operation may be supported by a credential device 1180 that may provide authentication, authorization, and other related information and services.

In some embodiments, system memory 11110 may be one embodiment of a computer-accessible medium configured to store program instructions and data as described herein for FIGS. 1-10 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1100 via I/O interface 11110. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1100 as system memory 11110 or another type of memory. Portions or all of multiple computing devices, such as those illustrated in FIG. 11, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

The communications devices as used herein may refer to devices including, but not limited to, smartphones, cellular-enabled tablets and laptops, companion devices (e.g., smart watches), and non-consumer devices (telematics device in an automobile, cellular-connected utility meters, any of which may include some number of credential device(s) 1180), and the like.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A system for providing interoperation between s Fifth Generation (5G) Non-Terrestrial Network (NTN) and 3rd Generation Partnership Project (3GPP) 5G network with a satellite-based communications network, the system comprising:

- a Satellite Access Network (SAN) configured to process Satellite Digital Video Broadcast (DBB) waveforms, wherein an egress interface of a wireline access network of the SAN is the V interface;
- a Satellite Access Node (sAN) configured with functionality of a ground station modem and portions of an existing network management system (NMS), wherein the NMS is configured with topology information of the satellite-based communications network and a remote modem configured to connect a local network to a Satellite Network Operator Data Network; and a Fixed Network-Residential Gateway (FN-RG) that comprises a logical representation of the remote modem, the FN-RG located at a ground station and configured to manage connectivity and interworking with a 5G Core via an Access Gateway Function (AGF).

Clause 2: The system of clause 1, wherein the SAN conforms with ETSI TR-101/TR-178.

Clause 3: The system of any of clauses 1-2, wherein the AGF conforms to TS 23.316, BBF TR-45612, and BBF TR-47012.

Clause 4: The system of any of clauses 1-3, wherein the remote modem provides connectivity to a satellite network operator (SNO) data network (DN) via a vModem connection.

Clause 5: The system of any of clauses 1-4, wherein FN-RG is operable to manage resources for:

transmitting data received from the AGF over a V-Interface on a Forward Link; and forwarding data from a satellite terminal on a return link to the AGF.

Clause 6: The system of any of clauses 1-5, wherein the remote modem is authenticated prior to initiating an L2 connection with the AGF.

Clause 7: The system of clauses 1-6, wherein the FN-RG connects to the AGF via a L2 connection based on wireline access network (wAN) specific procedures using a V-interface.

Clause 8: The system of any of clauses 1-7, wherein a Link Control Protocol (LCP) Terminate procedure is used to allow the FN-RG to report when connectivity to the remote modem is lost.

Clause 9: The system of any of clauses 1-8, wherein the AGF proxies the FN-RG L2 connection's initiation to establish a user plane connection to the 5G network by initiating PDU session establishment.

Clause 10: The system of any of clauses 1-9, wherein remote satellites are assigned a Line ID the remote modem is mapped to one of the Line IDs before forwarding the L2 connection over a V-Interface to the AGF.

Clause 11: The system of any of clauses 1-10, wherein the FN-RG initiates a LCP Terminate-Request when a connection between the remote modem and ground station is determined to have failed.

Clause 12: A Fixed Network-Residential Gateway (FN-RG) configured to facilitate interoperation between Fifth Generation (5G) Non-Terrestrial Networks (NTN) and 3rd Generation Partnership Project (3GPP) 5G network with a satellite-based communications network, the FN-RG configured as a logical representation of a remote modem and located at a ground station and configured to manage connectivity and interworking with a 5G Core via an Access Gateway Function (AGF), the FN-RG configured to:

connect a local network to a Satellite Network Operator Data Network;

interoperate with a network management system (NMS) configured with topology information of the satellite-based communications network and which is part of a Satellite Access Node (sAN), wherein the sAN is configured with functionality of a ground station modem and portions of an existing network management system (NMS), and wherein the NMS is configured with topology information of the satellite-based communications network; and communicate with a Satellite Access Network (SAN) configured to process Satellite Digital Video Broadcast (DBB) waveforms.

Clause 13: The FN-RG of clause 12, wherein the SAN conforms with ETSI TR-101/TR-178.

Clause 14: The FN-RG of any of clauses 12 and 13, wherein the AGF conforms to TS 23.316, BBF TR-45612, and BBF TR-47012.

Clause 15: The FN-RG of any of clauses 12-14, wherein the remote modem provides connectivity to a satellite network operator (SNO) data network (DN) via a vModem connection.

Clause 16: The FN-RG of any of clauses 12-15, wherein FN-RG is operable to manage resources for:

transmitting data received from the AGF over a V-Interface on a Forward Link; and forwarding data from a satellite terminal on a return link to the AGF.

Clause 17: The FN-RG of any of clauses 12-16, wherein the remote modem is authenticated prior to initiating an L2 connection with the AGF.

Clause 18: The FN-RG of any of clauses 12-17, wherein the FN-RG connects to the AGF via a L2 connection based on wireline access network (wAN) specific procedures using a V-interface.

Clause 19: The FN-RG of any of clauses 12-18, wherein:

the AGF proxies the FN-RG L2 connection's initiation to establish a user plane connection to the 5G network by initiating PDU session establishment;

remote satellites are assigned a Line ID the remote modem is mapped to one of the Line IDs before forwarding the L2 connection over a V-Interface to the AGF; and the FN-RG initiates a LCP Terminate-Request when a connection between the remote modem and ground station is determined to have failed.

Clause 20: A modem configured to facilitate interoperation between Fifth Generation (5G) Non-Terrestrial Networks (NTN) and 3rd Generation Partnership Project (3GPP) 5G network with a satellite-based communications network, the modem configured to manage connectivity and interworking with a 5G Core via an Access Gateway Function (AGF), the modem further configured to:

connect a local network to a Satellite Network Operator Data Network;

interoperate with a network management system (NMS) configured with topology information of the satellite-based communications network and which is part of a Satellite Access Node (sAN), wherein the sAN is configured with functionality of a ground station modem and portions of an existing network management system (NMS), and wherein the NMS is configured with topology information of the satellite-based communications network; and communicate with a Satellite Access Network (SAN) configured to process Satellite Digital Video Broadcast (DBB) waveforms.

The invention claimed is:

1. A system for providing interoperation between a Fifth Generation (5G) Non-Terrestrial Network (NTN) and 3rd Generation Partnership Project (3GPP) 5G network with a satellite-based communications network, the system comprising:

a Satellite Access Network (SAN) configured to process Satellite Digital Video Broadcast (DBB) waveforms, wherein an egress interface of a wireline access network of the SAN is a V interface;

a Satellite Access Node (sAN) configured with functionality of a ground station modem and portions of an existing network management system (NMS), wherein the NMS is configured with topology information of the satellite-based communications network and a remote satellite modem configured to connect a local network to a Satellite Network Operator Data Network; and a Fixed Network-Residential Gateway (FN-RG) that comprises a logical representation of the remote satellite modem, the FN-RG located at a ground station and configured to manage connectivity and interworking with a 5G Core via an Access Gateway Function (AGF), wherein the FN-RG is configured to act as a proxy for the remote satellite modem;

wherein the sAN is configured to provide connectivity between the SAN and the FN-RG.

2. The system of claim 1, wherein the sAN conforms with satellite communication waveforms defined in ETSI EN 302 307 and ETS EN 302 307-2, and wherein the sAN is based on wireline Access Node (wAN) functionality specified in BBF TR-456i2 and BBF TR-470i2 with enhancements to support satellite access.

3. The system of claim 1, wherein the AGF conforms to TS 23.316, BBF TR-456i2, and BBF TR-470i2.

4. The system of claim 1, wherein the remote satellite modem provides connectivity to a satellite network operator (SNO) data network (DN) via a vModem connection.

5. The system of claim 1, wherein FN-RG is operable to manage resources for:

transmitting data received from the AGF over a V-Interface on a Forward Link; and forwarding data from a satellite terminal on a return link to the AGF.

6. The system of claim 1, wherein the remote satellite modem is authenticated prior to initiating an L2 connection with the AGF.

7. The system of claim 1, wherein the FN-RG connects to the AGF via a L2 connection based on wireline access network (wAN) specific procedures using a V-interface.

8. The system of claim 7, wherein the AGF proxies an L2 connection initiation by the FN-RG to establish a user plane connection to the 5G network by initiating Protocol Data Unit (PDU) session establishment.

9. The system of claim 7, wherein remote satellites are assigned a Line ID the remote satellite modem is mapped to one of the Line IDs before forwarding the L2 connection over a V-Interface to the AGF.

10. The system of claim 7, wherein the FN-RG initiates a LCP Terminate-Request when a connection between the remote satellite modem and ground station is determined to have failed.

11. The system of claim 1, wherein a Link Control Protocol (LCP) Terminate procedure is used to allow the FN-RG to report when connectivity to the remote satellite modem is lost.

12. A method for providing interoperation between a Fifth Generation (5G) Non-Terrestrial Network (NTN) and 3rd Generation Partnership Project (3GPP) 5G network with a satellite-based communications network, the method comprising:

processing, by a Satellite Access Network (SAN), Satellite Digital Video Broadcast (DBB) waveforms, wherein an egress interface of a wireline access network of the SAN is a V interface;

operating a Satellite Access Node (sAN) configured with functionality of a ground station modem and portions of an existing network management system (NMS), wherein the NMS is configured with topology information of the satellite-based communications network and a remote satellite modem configured to connect a local network to a Satellite Network Operator Data Network; and operating a Fixed Network-Residential Gateway (FN-RG) that comprises a logical representation of the remote satellite modem, the FN-RG located at a ground station and configured to manage connectivity and interworking with a 5G Core via an Access Gateway Function (AGF), wherein the FN-RG is configured to act as a proxy for the remote satellite modem;

wherein the sAN is configured to provide connectivity between the SAN and the FN-RG.

13. The method of claim 12, wherein the sAN conforms with satellite communication waveforms defined in ETSI EN 302 307 and ETS EN 302 307-2, and wherein the sAN is based on wireline Access Node (wAN) functionality specified in BBF TR-45612 and BBF TR-47012 with enhancements to support satellite access.

14. The method of claim 12, wherein the AGF conforms to TS 23.316, BBF TR-45612, and BBF TR-470i2.

15. The method of claim 12, wherein the remote satellite modem provides connectivity to a satellite network operator (SNO) data network (DN) via a vModem connection.

16. The method of claim 12, wherein FN-RG is operable to manage resources for:

transmitting data received from the AGF over a V-Interface on a Forward Link; and forwarding data from a satellite terminal on a return link to the AGF.

17. The method of claim 12, wherein the remote modem is authenticated prior to initiating an L2 connection with the AGF.

18. The method of claim 12, wherein the FN-RG connects to the AGF via a L2 connection based on wireline access network (wAN) specific procedures using a V-interface.

19. The method of claim 12, wherein a Link Control Protocol (LCP) Terminate procedure is used to allow the FN-RG to report when connectivity to the remote modem is lost.

20. The method of claim 12, wherein the AGF proxies an L2 connection initiation by the FN-RG to establish a user plane connection to the 5G network by initiating PDU session establishment.

* * * * *